(12) United States Patent
Ye et al.

(10) Patent No.: US 11,462,029 B2
(45) Date of Patent: Oct. 4, 2022

(54) OBJECT DETECTION NETWORK AND METHOD

(71) Applicant: SHENZHEN DEEPROUTE.AI CO., LTD, Shenzhen (CN)

(72) Inventors: Maosheng Ye, Shenzhen (CN); Shuangjie Xu, Shenzhen (CN); Tongyi Cao, Guangzhou (CN)

(73) Assignee: SHENZHEN DEEPROUTE.AI CO., LTD, Shenzhen (CN)

( * ) Notice: Subject to any disclaimer, the term of this patent is extended or adjusted under 35 U.S.C. 154(b) by 4 days.

(21) Appl. No.: 17/113,342

(22) Filed: Dec. 7, 2020

(65) Prior Publication Data
US 2022/0180088 A1    Jun. 9, 2022

(51) Int. Cl.
G06K 9/00 (2022.01)
G06V 20/64 (2022.01)
G06V 10/40 (2022.01)

(52) U.S. Cl.
CPC .............. *G06V 20/64* (2022.01); *G06V 10/40* (2022.01)

(58) Field of Classification Search
CPC ................................ G06V 20/64; G06V 10/40
See application file for complete search history.

(56) References Cited

U.S. PATENT DOCUMENTS

2020/0372265 A1* 11/2020 Ko ......................... G06V 20/58

FOREIGN PATENT DOCUMENTS

| CN | 110084124 A | * | 8/2019 | ......... G06K 9/00711 |
| CN | 110348384 A | * | 10/2019 | |
| CN | 110543890 A | * | 12/2019 | |
| CN | 111242041 A | * | 6/2020 | |
| CN | 111832655 A | * | 10/2020 | |
| EP | 3651064 A1 | * | 5/2020 | ............. G01S 17/42 |

OTHER PUBLICATIONS

Voxel-FPN: Multi-Scale Voxel Feature Aggregation for 3D Object Detection from LIDAR Point Clouds, Hongwu Kuang et al., Sensors, Jan. 20, 2020, pp. 1-18 (Year: 2020).*
HVNet: Hybrid Voxel Network for LiDAR Based 3D Object Detection, Maosheng Ye et al., CVF, Jun. 2020, pp. 1631-1640 (Year: 2020).*

(Continued)

*Primary Examiner* — Jayesh A Patel
(74) *Attorney, Agent, or Firm* — Dorsey & Whitney LLP (57) ABSTRACT

An object detection network includes: a hybrid voxel feature extractor configured to acquire a raw point cloud, extract a hybrid scale voxel feature from the raw point cloud, and project the hybrid scale voxel feature to generate a pseudo-image feature map; a backbone network configured to perform a hybrid voxel scale feature fusion by using the pseudo-image feature map to generate multi-class pyramid features; and a detection head configured to predict a three-dimensional object box of a corresponding class according to the multi-class pyramid features. The object detection network can effectively solve a problem that under a single voxel scale, inference time is longer if the voxel scale is smaller, and an intricate feature cannot be captured and a smaller object cannot be accurately located if the voxel scale is larger. Different classes of 3D objects can be detected quickly and accurately in a 3D scene.

17 Claims, 4 Drawing Sheets

(56) References Cited

OTHER PUBLICATIONS

CenterNet3D:An Anchor free Object Detector for Autonomous Driving, Wang Guojun et al., ResearchGate, Jul. 2020, pp. 1-9 (Year: 2020).*
Scale-Aware Attention-Based PillarsNet (SAPN) Based 3D Object Detection for Point Cloud, Xiang Song et al., Hindawi, Oct. 22, 2020, pp. 1-12 (Year: 2020).*
Clustered Object Detection in Aerial Images, Fan Yang et al., CVF, Oct. 2019, pp. 8311-8320 (Year: 2019).*
Learning Depth-Guided Convolutions for Monocular 3D Object Detection, Mingyu Ding et al., Jun. 2020, CVF, pp. 1-12 (Year: 2020).*
PointPillars: Fast Encoders for Object Detection From Point Clouds, Alex H Lang et al., CVF, 2019, pp. 12697-12705 (Year: 2019).*
Hybrid Voxel Network for LiDAR Based 3D Object Detection (English), Maosheng Ye et al., IP.Com, Feb. 29, 2020, pp. 1-2 (Year: 2020).*

* cited by examiner

OBJECT DETECTION NETWORK AND METHOD

TECHNICAL FIELD

The present disclosure relates to an object detection network and method, and a storage medium.

BACKGROUND

A three-dimensional (3D) object detection refers to recognizing and locating an object in a three-dimensional scene. a two-dimensional (2D) voxelization performed by a Voxel based PointNet feature extractor on a point cloud can provide a high efficient detection. Since a size of a feature map determines computation and storage costs, a size of the voxel becomes a difficult parameter to balance. The smaller the size of the voxel, the better the performance, especially for a smaller object, but which may lead to longer inference time. A larger voxel can cover a same point cloud area with a smaller feature map, but cannot capture an intricate feature and an accurate position of a smaller object.

SUMMARY

In view of this, in order to address the above technical problems, it is necessary to provide an object detection network and method, and a non-transitory computer readable storage medium.

In the first aspect of the present disclosure, an object detection network is provided, which includes:

a hybrid voxel feature extractor configured to acquire a raw point cloud, extract a hybrid scale voxel feature from the raw point cloud, and project the hybrid scale voxel feature to generate a pseudo-image feature map;

a backbone network configured to perform a hybrid scale voxel feature fusion by using the pseudo-image feature map and generate multi-class pyramid features; and a detection head configured to predict a three-dimensional object box of a corresponding class according to the multi-class pyramid features.

In the second aspect of the present disclosure, an object detection method is provided, which includes:

acquiring a raw point cloud, extracting a hybrid scale voxel feature from the raw point cloud, and projecting the hybrid scale voxel feature to generate a pseudo-image feature map;

performing a hybrid scale voxel feature fusion by using the pseudo-image feature map and generating multi-class pyramid features; and predicting a three-dimensional object box of a corresponding class according to the multi-class pyramid features.

In the third aspect of the present disclosure, a non-transitory computer readable storage medium is provided, which stores computer readable instructions, wherein the computer readable instructions are executed by a processor to execute the following steps:

acquiring a raw point cloud, extracting a hybrid scale voxel feature from the raw point cloud, and projecting the hybrid scale voxel feature to generate a pseudo-image feature map;

performing a hybrid scale voxel feature fusion by using the pseudo-image feature map and generating multi-class pyramid features; and predicting a three-dimensional object box of a corresponding class according to the multi-class pyramid features.

BRIEF DESCRIPTION OF THE DRAWINGS

In order to more clearly describe technical solutions of embodiments of the present disclosure, accompanying drawings used in the embodiments will be briefly introduced in the following. Apparently, the drawings in the following description are merely some embodiments of the present disclosure. A person of ordinary skill in the art can obtain other drawings based on these drawings without creative work.

DETAILED DESCRIPTION OF THE EMBODIMENTS

In order to make the technical solutions and advantages of the present disclosure clearer, the present disclosure is described in detail below with reference to the accompanying drawings and embodiments. It should be understood that the specific embodiments described here are only used for explaining the present disclosure, rather than limiting the present disclosure.

Figure 1:
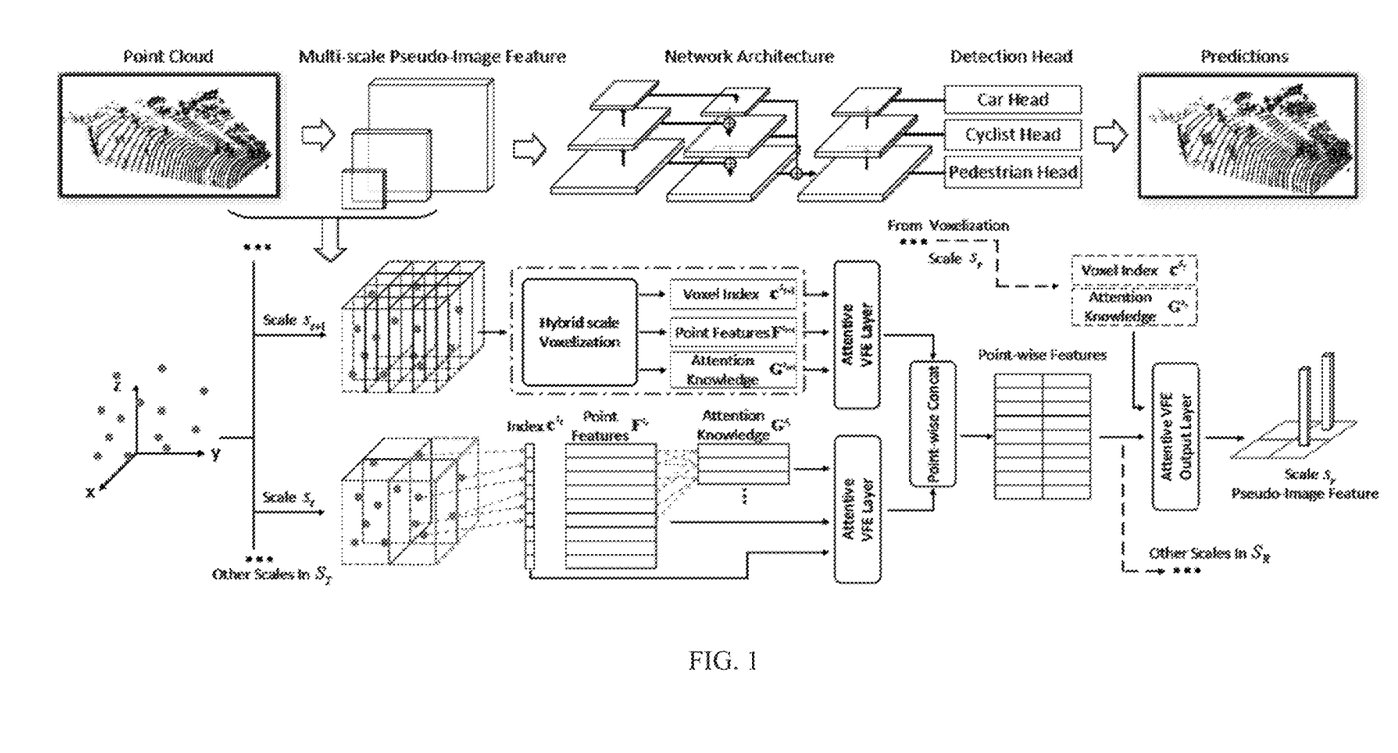
FIG. 1 is a schematic diagram illustrating an object detection network according to an embodiment of the present disclosure.

In some embodiments, a one-stage 3D object detector Hybrid VoxelNet (HVNet) is provided. As shown in FIG. 1, the one-stage 3D object detector HVNet includes a Hybrid Voxel Feature Extractor (HVFE), a backbone network and a detection head. The HVFE is mainly configured to perform hybrid scale voxelization, hybrid scale voxel feature encoding and dynamic feature projection on a raw point cloud to generate a pseudo-image feature map. The backbone network is configured to perform a hybrid voxel scale feature fusion on the pseudo-image feature map to generate a multi-class feature. The detection head is configured to predict 3D object boxes of different classes through the multi-class feature. By fusing a feature of a voxel feature encoder (VFE) of different scales at point-wise level and projecting the hybrid scale voxel feature into multiple pseudo-image feature maps, a problem that under a single voxel scale, inference time is longer if the voxel scale is smaller, and an intricate feature cannot be captured and a smaller object cannot be accurately located if the voxel scale is larger, is effectively solved. Therefore, different classes of 3D objects can be detected quickly and accurately in the 3D scene.

In some embodiments, the HVFE includes an Attentive Voxel Feature Encoding (AVFE) layer and an Attentive Voxel Feature Encoding Output (AVFEO) layer. The AVFE layer can perform attention feature encoding on a point in each voxel under the hybrid voxel scale, and the attention feature encoding is configured to generate a hybrid scale voxel feature. The AVFEO layer can restore projection scale information, and the projection scale information is configured to be projected into a pseudo-image feature map.

In some embodiments, there may be a plurality of voxel scales when the hybrid voxel feature extractor (HVFE) performs the voxelization, and there may be a plurality of projection scales when performing a projection into the pseudo-image. The term "plurality" refers to two or more. The projection scale can be less than the voxel scale.

In some embodiments, the Hybrid Voxel Feature Extractor (HVFE) performs a voxelization on a space of the raw point cloud by using multiple voxel scales, and assigns a corresponding voxel with multiple voxel scales to each point in the raw point cloud. A raw point cloud can be represented by an unordered point set $\{p_1, p_2, \ldots, p_N\}$ with $p_i \in \mathbb{R}^d$. Each point in the raw point cloud consists of two parts, i.e., a three-dimensional coordinate (x, y, z) of the point and a point cloud feature $f_i \in \mathbb{R}^{d+3}$ on the point. A physical scale range we detected is defined as L×W×H, respectively from the minimum ($x_{min}$, $y_{min}$, $z_{min}$) to the maximum ($x_{max}$, $y_{max}$, $z_{max}$). the voxelization refers to separating the space with small grids, and matching all points in the raw point cloud with IDs of the divided grids. In prior methods, such as VoxelNet and PointPillar, the process of matching the IDs includes a step of pre-allocating a space with a corresponding size in a memory. If the number of points allocated in one grid exceeds a preset space size, the exceeded points will be dropped, which may cause loss of information of some points, and the inference result cannot be reproduced. In the present disclosure, in the hybrid scale voxelization stage, only the ID of the voxel is recorded, and there is no need to pre-allocate a space with the corresponding size in the memory. Assume that a point cloud space of the raw point cloud is voxelized into a voxel set $V=\{V_j | j=1, \ldots, N_V\}$, and the size of each voxel is $V_L \times V_W \times V_H$. $V_H$ is set to H. For an object voxel under the voxel scale s, a point-wise index $c_i$ plays the role of a cursor, indicating a voxel ID to which the point belongs. The expression is:

$$c_i^{(s)} = \left\lfloor \frac{(x_i - x_{min})}{V_H s} \right\rfloor \left\lfloor \frac{L}{V_L s} \right\rfloor + \left\lfloor \frac{(y_i - y_{min})}{V_W s} \right\rfloor. \quad (1)$$

The point cloud space can be voxelized to different voxel scales with reference to the above mode. Different from the mode in the MV method in which the bi-directional relationship is required, in the present disclosure, only a mapping relationship from a point to a voxel needs to be recorded, and then a voxel to which each point belongs in different voxel scales can be known. In the hybrid scale voxelization stage, only the index is spatially allocated. In the hybrid scale voxelization stage, an index set composed of the point-wise indexes under each voxel scale can be referred to as a first index set. Compared to other methods in which the number of points inside each voxel is limited, all points in each voxel are retained in the present disclosure, which is conducive to improving the accuracy of the object detection.

After performing the hybrid scale voxelization, a scale voxel feature of each point in the raw point cloud under each voxel scale can be computed. The point cloud feature is a low-dimensional feature, which can be mapped into a high-dimensional scale voxel feature by a feature mapping. For example, a 3D point cloud feature $f_i$, can be mapped into a 8D scale voxel feature F through a 3*8 matrix. The scale voxel feature F of the same point is different under different voxel scales.

In the conventional method, the PointPillar is taken as an example, the voxel-based method is limited to a fixed voxel scale s, thus each extracted point cloud feature only contains information of the voxel scale s. Besides, a size of a final projected features is the same as a corresponding voxel size, which means that the computation complexity may rise rapidly with the addition of a fine-grained voxel scale. Assume that a projected pseudo-image feature $I^s \in \mathbb{R}^{N_W \times N_L \times N_H}$ ($I^{sr}$ refers to a pseudo-image feature), and $N_L = \lfloor L/(V_L s) \rfloor$, $N_W = \lfloor W/(V_W s) \rfloor$, and $N_H$ is an output dimension of the projection. When s reduces by n times, $N_W \times N_L$ can increase by $n^2$ times.

HVFE encodes the point-wise scale voxel feature under one of the voxel scales with voxel features of the same point under other voxel scales, to generate a point-wise hybrid scale voxel feature. A point-wise scale voxel feature set under one voxel scale can be represented as $S_T = \{s_t / 1 < t < N_T\}$.

In some embodiments, the projection scale information is restored by using the hybrid scale voxel feature, and the pseudo-image feature map is generated according to the projection scale information. The AVFE layer encodes a voxel scale feature set, a first index set, and a first attention feature set under each voxel scale to generate a voxel scale feature set, aggregates the voxel scale feature set under each voxel scale, and generates a point-wise hybrid scale voxel feature. For example, the hybrid voxelization is performed on the raw point cloud to obtain a first index set $c^{S_T} = \{c_i^{(S_t)} | s_t \in S_T, i \in [1, N]\}$, which consists of first indexes. The voxel-wise scale voxel features of the points are aggregated to generate and obtain the first attention feature set. A feature in the first attention feature set is represented by $G^{S_T}$. An attention feature of the same point has the same dimensionality as the scale voxel feature. For a voxel scale $s_{t+1}$, an index thereof is $c^{s_{t+1}}$, a voxel scale feature thereof is $F^{s_{t+1}}$, and an attention feature thereof is $G^{s_{t+1}}$. An index of the voxel scale $s_t$ contains $c^{s_t}$, and a voxel scale feature thereof is $F^{s_t}$, and an attention feature thereof is $G^{s_t}$, and so on. The AVFE layer encodes the F, $G^{S_T}$ and $C^{S_T}$ into a voxel scale feature set $H^{S_T}$, specified to each voxel scale s with a feature $H^{S_T} \in \mathbb{R}^{N \times q}$. After that, $H^{S_T}$ is aggregated into a hybrid scale voxel feature $H \in \mathbb{R}^{N \times q}$ through a mode of a tensor concatenation, where $e=2qN_T$. It is validated by experiments that only limited $N_T$ of input hybrid scale voxel features are needed to restore information of unseen voxel scale set $S_T$ by extracting sufficient information through a dynamic feature projection.

In some embodiments, the AVFEO layer restores the projection scale information of the point-wise hybrid scale voxel feature, the second index set and the second attention feature set under each projection scale, and projects the restored projection scale information into the pseudo-image feature map. The hybrid scale voxel feature H is a high-dimensional global scale feature, which has rich voxel scale information. Therefore, the projection scale in the protection scale set $S_R = \{s_r | 1 < r < N_R\}$ of the pseudo-image features may be out of the voxel scale set $S_T$. These unlearned scales will be projected and mapped by the feature H. In order to restore information of each projection scale $s_r$ from H during the dynamically projection, some additional scale-related information needs to be used as guidance. The second index set $c^{S_R}=\{c^{(S_r)}|s_r \in S_R\}$, and the second attention feature set $G^{S_R}$ are pre-computed and obtained before the projection. The second attention feature set is pre-computed and obtained before the projection by using the prior distribution of points in the raw point cloud. For the projection scale $s_{r+1}$, an index thereof is $c^{s_{r+1}}$, and an attention feature thereof is $G^{s_{r+1}}$. The index of the projection scale $s_r$ contains $c^{s_r}$, and the attention feature thereof is $G^{s_r}$, and so on.

The attentive voxel feature encoding output (AVFEO) layer takes the point-wise hybrid scale voxel feature, the index and the attention feature under each projection scale as inputs to restore information of the corresponding projection scale, and projects the projection scale information onto the corresponding pseudo-image feature. For example, the AVFEO layer takes H, $c^{s_r}$ and $G^{s_r}$ as inputs to restore information of the projection scale $s_r$, and then projects the information of the projection scale $s_r$ onto the pseudo-image feature $I^{s_r}$. The same as the attentive voxel feature encoding (AVFE) layer, all layers in the AVFEO layer share parameters. In the dynamic feature projection, $G^{s_r}$ is a key for restoring the scale feature, which guides the AVFEO layer to pay more attention to the relationship form H to the projection scale $s_r$. In addition, $c^{s_r}$ is used for the efficient implementation of the AVFEO layer.

Figure 2:
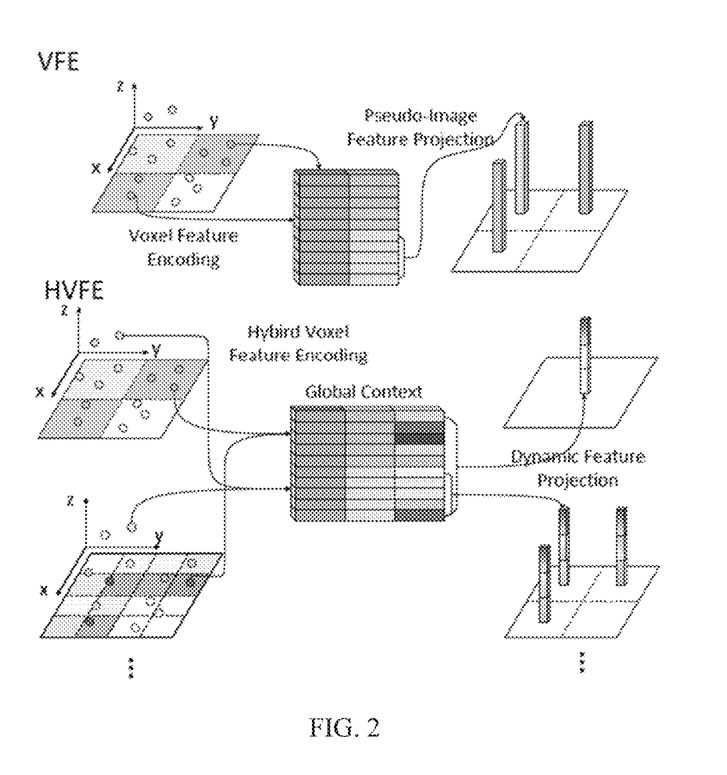
FIG. 2 is a schematic diagram illustrating voxel feature extraction in different networks according to an embodiment of the present disclosure.

In the traditional feature extraction method, for example, in the voxel feature encoding (VFE) method, as shown in the VFE of FIG. 2, the raw point cloud is voxelized through a specified two-dimensional voxel grid, and the voxel scale is fixed. A grid dependent point-wise feature is computed for each point in the raw point cloud, and is input into the PointNet style feature encoder. The point-wise feature is aggregated into a voxel-level feature and is projected back to its original grid to form a pseudo-image feature map. There is only one voxel scale in the VFE method, and only one projection scale of the pseudo-image feature map. The feature of each point in the VFE method only contains a voxel feature of a specified voxel scale. The size of the voxel is a key parameter in the VFE method. The smaller voxel can capture finer geometric feature and can better locate the detected object, but require longer inference time. The larger voxel can lead to smaller pseudo-image feature map and faster inference speed, but has inferior performance, especially for a smaller detected object.

In the hybrid voxel network (HVNet) provided by the present disclosure, there may be a plurality of voxel scales when the hybrid voxel feature extractor (HVFE) performs the voxelization, and there may be one or more projection scales when the pseudo-image is projected. The projection scale can be less than the voxel scale, as shown in the HVFE of FIG. 2. HVFE aggregates the scale voxel features under the hybrid voxel scale into a global context, and then projects them to the pseudo-image feature map in the dynamic projection scale.

By decoupling voxel feature extraction and pseudo-image feature map projection, the features extracted by the hybrid voxel feature extractor (HVFE) are effectively fused. The features of all voxels are extracted, and the scale aggregation is performed in a compact point-wise form to achieve higher computational efficiency and storage efficiency.

For example, a set of voxel scales can be {0.1 m, 0.2 m, 0.4 m}, and a set of projection scales is {0.4 m}. For a spatial area of a size of 80 m×80 m, a pseudo-image feature map of a size of 200×200 can be finally obtained. For a general VFE, a feature map of a size of 800×800 is needed to capture a fine feature at a voxel scale of 0.1 m.

In the traditional voxel feature encoding layer, data is voxelized by setting the maximum number of points in each voxel and allocating a memory in advance. After that, a linear transformation and a max pooling are conducted in each voxel to aggregate features. Then the pseudo-image feature is extracted according to a physical location of the voxel. Although the VFE method provides a simple method for extracting a feature of a sparse point cloud, which has a behavior of stochastically dropping a point during the voxelization, leading to a tremendous information loss and an instability prediction behavior. Moreover, zero padding is conducted when the number of points is lower than a limitation, which can greatly increase the amount of computation and memory consumption, and introduce error additional information.

In some embodiments, the hybrid voxel feature extractor includes: the attentive voxel feature encoding (AVFE) layer and the attentive voxel feature encoding output (AVFEO) layer. The AVFE layer is configured to perform voxel-wise attention feature encoding under each voxel scale. The attention feature encoding is configured to generate the hybrid scale voxel feature. The AVFEO is configured to restore the information of the projection scale. The information of the projection scale is configured to be projected into the pseudo-image feature map.

As an expansion of a raw point-wise feature $p_i$, an attention feature $g_j \in \mathbb{R}^q$ for a voxel $V_j$ is obtained by the voxel-wise point feature aggregation. The attention feature is configured to guide the feature encoding network to concern more about the associated information between points within the same voxel. The computation of the attention feature of the voxel $V_j$ under a voxel scale s is taken as an example. An average spatial feature is computed by using spatial features of all points in a voxel $V_j$, and an average feature is computed by using voxel features of all points in the voxel $V_j$. An aggregation is performed by using the 3D spatial feature, the average spatial feature, the point cloud feature and the average feature of the point to generate the point-wise attention feature of the voxel $V_j$. The point-wise attention feature of the voxel $V_j$ is utilized to generate an attention feature G of the voxel $V_j$.

Assume that in the voxel $V_j$, a voxel cursor c is set to the point $p_i$, and the attention feature $g_j$ of the point $p_i$ can be represented as:

$$g_i = \left(\left(x_i - \frac{\sum U_j x_k}{N_{U_j}}\right) \oplus f_i\right) \oplus \frac{\sum U_j p_k}{N_{U_j}}, \quad (2)$$

where $\oplus$ represents a tensor concatenate operation. The set $U_j$ refers to an index set of points that lies in the same voxel as $p_i$, and is denoted as $U_j=\{k|0<k<N \& c_k=c_i\}$.

Figure 3:
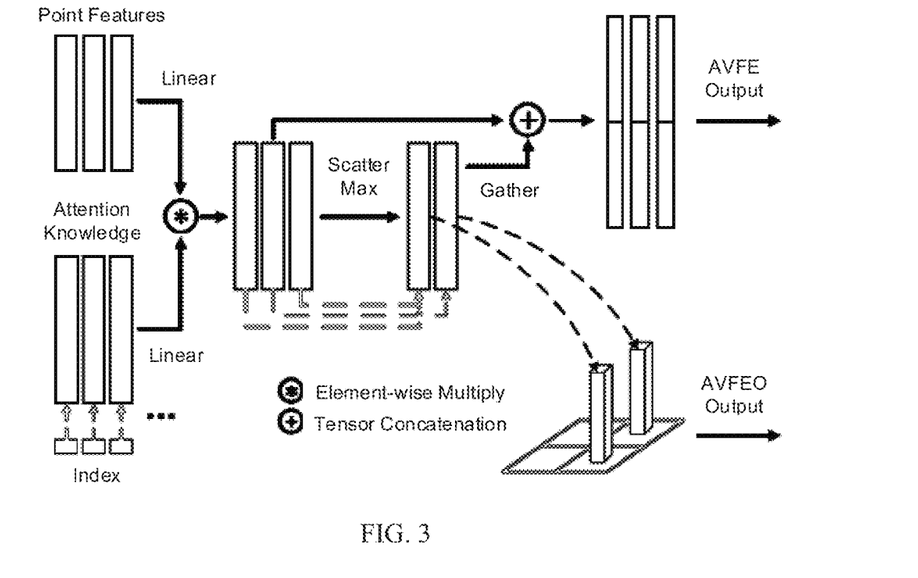
FIG. 3 is a schematic diagram illustrating an AVFE layer and an AVFEO layer according to an embodiment of the present disclosure.

When the dynamic feature projection is performed, as shown in FIG. 3, the hybrid scale voxel feature and the attention feature firstly pass through a shared full connection layer, followed by an element-wise matrix multiply to obtain mapping features. The mapping features are aggregated through a max pooling layer to obtain projection scale information. The projection scale information includes a voxel-wise projection feature $G' \in \mathbb{R}^{N \times q}$. For the AVFEO layer, each feature in the G' is mapped as a point $(x_i^{s_r}, y_i^{s_r})$ at the pseudo-image feature $I^{s_r}$, with a corresponding formula:

$$x_i^{s_r} = c_j^{s_r} \left| \left\lfloor \frac{W}{v_W s_r} \right\rfloor \right., \quad y_i^{s_r} = c_j^{s_r} \bmod \left\lfloor \frac{W}{v_W s_r} \right\rfloor \quad (3)$$

where $s_r$ denotes a projection scale, | denotes exact division and mod denotes a module operation.

In some embodiments, the raw point cloud is sparse data. The present disclosure proposes to transform the sparse matrix operation in the point cloud into a dense matrix of a corresponding index. The process of obtaining $U_j$ requires a large number of loop operations. it is verified by experiments the efficiency of the HVNet is related to the performance of the index computation strategy and a parallel stream processing schedules of the entire network model. key index-based propagation operators including Scatter operator and Gather operator are implemented on a Graphic Processing Unit (GPU).

The Gather operator performs the feature aggregation of sparse point data in the voxel behaves as a tensor slicing operation based on a cursor vector. The Scatter operator processes all values in the source tensor according to an index specified in a given cursor, and finally outputs separately according to each different index. In an embodiment, a Scatter Mean is used in the voxel-wise attention feature, and a Scatter Max is used in the AVFE layer and the AVFEO layer. The Scatter Max is taken as an example, a formula can be given as:

$$\text{out}_i = \max(\text{out}_i, \max(\{\text{src}_j | c_j = i, j \in c\})),$$

where out and src represents output and source respectively; c is the index, indicating an index corresponding to each position in the src. In the practice of the Scatter operator, a use of atomic lock of a GPU Global Memory can ensure the consistency and reproducibility of an argmax result.

In some embodiments, the backbone network may be a 2D convolutional backbone network. The 2D convolutional backbone network includes a main stream network and a feature fusion pyramid network (FFPN). The main stream network aggregates pseudo-image feature maps of multiple projection scales. The FFPN performs class feature extraction on aggregated features of the main stream network to obtain a class-specific pyramid feature.

In some embodiments, the main stream network includes a plurality of network blocks (BLOCKs). The pseudo-image feature maps of different projection scales are input into different network blocks. The next projection scale is a preset multiple of the previous projection scale. For example, a projection scale $s_{r+1} = 2s_r$. The convolutional layers in different network blocks can be partially the same or absolutely different. Starting from a second network block, a first layer in the network block reduces the space size of the pseudo-image feature through the convolution with a specified stride. For example, the specified stride can be 2×2.

Figure 4:
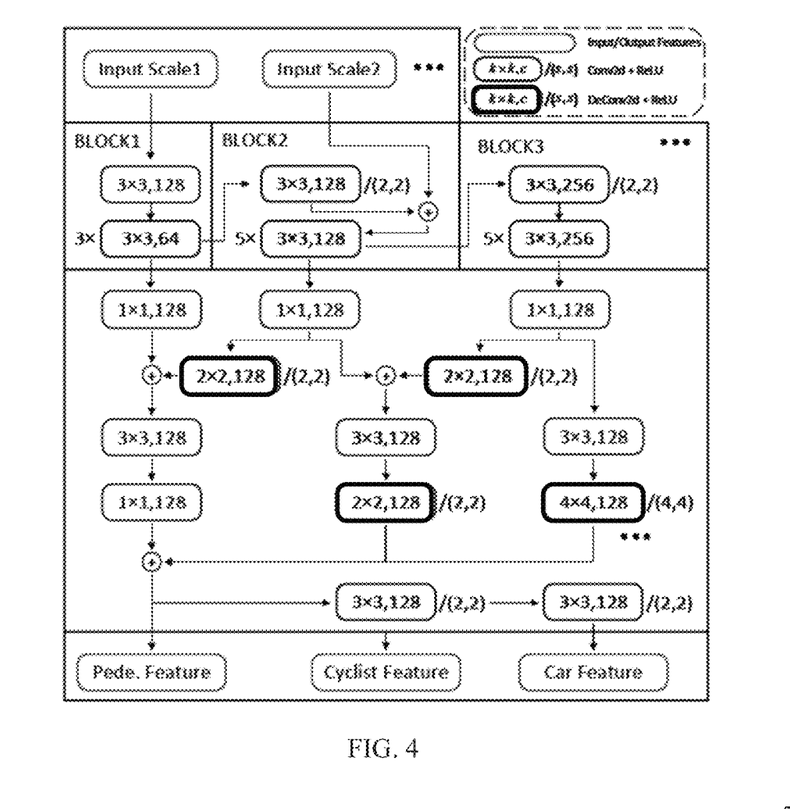
FIG. 4 is a schematic diagram illustrating a backbone network architecture according to an embodiment of the present disclosure.

The main stream network includes three network blocks as an example for illustration. The network structure of the 2D convolutional backbone network is shown in FIG. 4. A network block 1 takes the pseudo-image feature map $I^{s_1}$ as an input to perform a convolution operation, and takes a result of the convolution operation as an aggregated feature of the network block 1. A network block 2 aggregates the pseudo-image feature map $I^{s_2}$ and the aggregated feature output by the network block 1. When there are more network blocks, a latter network block aggregates the aggregated feature of a previous network block and a pseudo-image feature map of a next projection scale, and outputs an aggregated feature of the latter network block, and so on. For the last network block, such as a network block 3 in FIG. 4, the convolution operation can be performed on only the aggregated feature of the previous network block, and the result of the convolution operation is taken as an aggregated feature of the network block 3. The aggregated features of the three network blocks $$B_1 \in \mathbb{R}^{N_w \times N_L \times C_1}, B_2 \in \mathbb{R}^{\frac{N_w}{2} \times \frac{N_L}{2} \times C_2} \text{ and}$$

$$B_3 \in \mathbb{R}^{\frac{N_w}{4} \times \frac{N_L}{4} \times C_3}$$

are taken as inputs of the FFPN.

The present disclosure provides a scale fusion pyramid network with a stronger performance than the FPN network. Different from a traditional mode of feature fusion from top to bottom layer by layer, in the present disclosure, the scale fusion pyramid network connects the aggregated features of the network blocks at the smallest projection scale to obtain an intermediate feature, and obtains a class-specific pyramid feature by using the convolutional layers with different strides and the intermediate feature. The expression of the intermediate feature $B_f$ is:

$$B_f = \Sigma_{i=1}^{N_B} \Psi_i(B_i + 1_{i<N_B}\Gamma_{i+1}(B_{i+1})) \quad (4)$$

where + represents the tensor concatenate; 1 represents the indicator function; $N_B$ represents the number of $B_i$; and $\Gamma_i$ represents a deconvolution function for an aggregated feature $B_i$ of each input network block and is used for scale alignment. The class-wise pyramid feature can be represented as:

$$B_o^{(i)} = \gamma_i(B_f) \quad (5)$$

where $\gamma_i$ represents a convolutional layer with a different stride. Compared to Feature Fusion Single Shot MultiBox Detect (F-SSD), in the present disclosure features are fused in two stages: 1) layer by layer fusion of an intermediate feature as shown in the formula 4; 2) a plurality of downsample convolutional layers are used in the fusion process. A class-specific pyramid feature can be obtained in one forward propagation. For example, $B_o^{(1)}$ is a pyramid feature for a pedestrian class, $B_o^{(2)}$ is a pyramid feature for a cyclist class, and $B_o^{(3)}$ is a pyramid feature for a car class.

In some embodiments, the detection head can be a detection head in a Single Shot MultiBox Detector (SSD) network. A positive anchor is matched and selected by computing a Rotated Intersection over Union (RIoU) through an anchor and a labeled real box in a bird eye view (BEV). Each pyramid feature is wraped by three parallel 3×3 convolutional layers $\phi_c^{(i)}$, $\phi_l^{(i)}$ and $\phi_h^{(i)}$ to respectively obtain a classification probability, a vertex position offset and a height regression corresponding to each anchor, and output sizes thereof on the BEV are $N_{anc} \times N_{cls}$, $N_{anc} \times 8$ and $N_{anc} \times 2$ for z center and height.

Different from most voxel-based methods that predict a center x, y of a box and a length l, a width w, a height h and a declination θ, HVNet uses the vertex position offset between the real box and the anchor as an object function of the position, with an expression $\overrightarrow{\Delta\text{cor}} = \{\overrightarrow{\Delta x_i}, \overrightarrow{\Delta y_i} | i=1, 2, 3, 4\}$. Δcor represents one vector in $\mathbb{R}^8$. Assume that the position branch $\phi_l$ predicts an offset Δcor, then a position regression loss function can be given as $\mathcal{L}_{loc} = \Sigma$ Smooth L1(Δ$\overrightarrow{\text{cor}}$−Δcor). As for the classification branch $\phi_c$, a class probability $p_a$ of an anchor is given, a focal loss function is utilized to handle an unbalance of the number of samples between positive and negative samples, with an expression $\mathcal{L}_{cls} = -\alpha(1-p_a)^\gamma \log(p_a)$. In addition, , h predicted from the branch $\phi_h$ is given, and the loss in the vertical direction satisfies $\mathcal{L}_h = \Sigma_{b \in (z,h)}$ SmoothL1(Δb).

Therefore, a total loss function is to compute a weight of three items, which is represented by:

$$\mathcal{L} = \frac{1}{N_{pos}}(\lambda_{loc}\mathcal{L}_{loc} + \lambda_{cls}\mathcal{L}_{cls} + \lambda_h\mathcal{L}_h). \quad (6)$$

Figure 5:
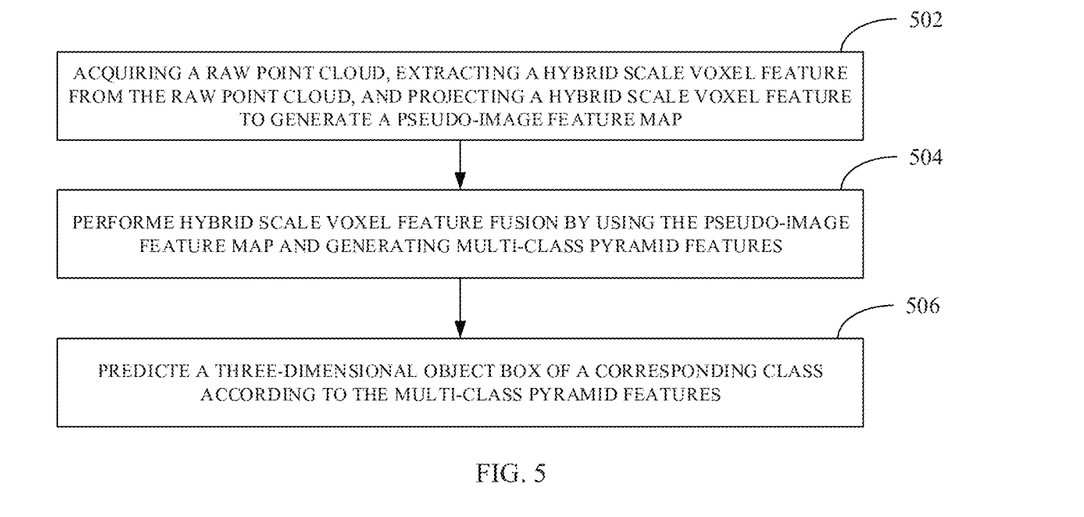
FIG. 5 is a flow chart showing an object detection method according to an embodiment of the present disclosure.

In some embodiments, an object detection method is provided, which can be executed by a processing logic. The processing logic includes a hardware (for example, a circuit, a dedicated logic, a programmable logic, a microcode, etc.), software (for example, an instruction running on a processing device) or a combination thereof. In an embodiment, the object detection method can be performed by the network of FIG. 1 or one or any combination of FIG. 1 and FIGS. 2, 3, and 4. As shown in FIG. 5, the method includes the following steps.

At step 502, a raw point cloud is acquired, a hybrid scale voxel feature is extracted from the raw point cloud, and the hybrid scale voxel feature is projected to generate a pseudo-image feature map.

At step 504, a hybrid scale voxel feature fusion is performed by using the pseudo-image feature map to generate multi-class pyramid features.

At step 506, a three-dimensional object box of a corresponding class is predicted according to the multi-class pyramid features.

The object detection method can be applied to an autonomous vehicle and a robot. The autonomous vehicle is taken as an example, a lidar scans the raw point cloud and transmits the raw point cloud to the in-vehicle computer. The in-vehicle computer performs a three-dimensional object detection based on the raw point cloud by using the processing logic.

It should be appreciated that although the various steps in the flow chart of FIG. 5 are shown in sequence as indicated by the arrows, these steps are not definitely performed in sequence in an order indicated by the arrows. Unless clearly stated in the description, the execution of these steps is not strictly limited in order, and these steps can be executed in other orders. Moreover, at least part of the steps in FIG. 5 can include a plurality of sub-steps or a plurality of stages. These sub-steps or stages are not definitely executed at the same time, but can be executed at different time. The order of the execution of these sub-steps or stages is not definitely performed in sequence, but may be performed in turns or alternatively with other steps or at least part of sub-steps or stages of other steps.

In some embodiments, the processing logic performs a hybrid scale voxelization on the raw point cloud, performs feature encoding by using the point cloud after the hybrid scale voxelization and generates a point-wise hybrid scale voxel feature.

In some embodiments, the processing logic uses the hybrid scale voxel feature to restore projection scale information, and generates a pseudo-image feature map based on the projection scale information.

In some embodiments, the processing logic aggregates pseudo-image feature maps of multiple projection scales to obtain the aggregated feature of the main network, and performs class feature extraction on the aggregated feature of the main network to obtain a class-specific pyramid feature. The processing logic inputs the pseudo-image feature maps of the multiple projection scales into each network block of the main stream network respectively, and a latter network block aggregates an aggregated feature of a previous network block and a pseudo-image feature map of a next projection scale, and outputs an aggregated feature of the latter network block until an aggregated feature of each network block is obtained. The first network block in the main stream network of the processing logic performs a convolution operation on the input pseudo-image feature map, and takes a result of the convolution operation as the aggregated feature of the first network block. The last network block in the main stream network of the processing logic performs a convolution operation on the aggregated feature of the previous network block, and takes a result of the convolution operation as an aggregated feature of the last network block.

In some embodiments, the processing logic calculates and obtains a parameter corresponding to each anchor by using the pyramid feature of each class, and obtains the three-dimensional object box according to the parameter. The parameter of the anchor includes a classification probability, a vertex position offset and a height regression.

Evaluation experiments of the HVNet on the KITTI dataset are as follows.

The KITTI dataset consists of 7,481 training images and 7,518 test images, as well as the corresponding point cloud of Car, Pedestrian and Cyclist categories. KITTI's metric is defined as an average precision (AP) of forty recall positions on the PR curve. Labels are divided into three subsets (easy, moderate and hard) based on an object size, occlusion and truncation levels. A physical detection range is a range from (0, −32, −3) to (64, 32, 2). A size of a base voxel is $V_L$=0.2, $V_W$=0.2, and a size of a corresponding pseudo-image is 320×320. In the process of encoding and decoding, the scale sets are respectively $S_T$={0.5,1,2} and $S_R$={1,2,4}. In addition, a feature dimension of $H^{S_T}$ is q=64, and a feature dimension of $i^{S_t}$ is $N_H$=128. The size of the anchor is designed as: [0.8, 0.8, 1.7] for Pedestrian, [0.8, 1.8, 1.5] for Cyclist, [1.7, 3.5, 1.56] and [2.0, 6.0, 1.56] for Car. Each class has the same anchor orientation angle in [0, π/4, π/2, 3π/4]. In the training process, an anchor with an RIoU score greater than [0.35, 0.35, 0.5] for Pedestrian, Cyclist, and Car respectively is selected as a positive sample and an anchor with the RIoU score lower than [0.25, 0.25, 0.35] is selected as a negative sample. In the test phase, a predicted score threshold is greater than 0.2, and a rotated Non-Maximum Suppression (NMS) threshold is set to [0.75, 0.75, 0.25]. In the loss function design phrase, a and y for a focus loss function are set to [0.75, 0.75, 0.25] and [2, 2, 2] respectively. Loss weights of the loss function are $\lambda_{loc}$=1, $\lambda_{cls}$=1, $\lambda_h$=1.5. The HVNet is trained for 70 epochs with an Adam optimizer, and an initial learning rate is $1_r$=2e$^{-4}$ with a weight decay 1e$^{-4}$. The warmup strategy with 300 warmup iterations and 1/3 warmup ratio is used. In addition, the learning rate drops to 0.1 in the 40th cycle and the 60th cycle respectively.

Before training, 3D data augmentation is performed on the point cloud data. Global random flipping, rotation, scaling and translation are applied to the whole point cloud data. The flipping probability is set to 0.5, the rotation angle ranges obey a normal distribution from [−η/2, η/2], the scaling ratio is between [0.95, 1.05], and the location translation obeys normal distribution with a mean value of 0 and standard deviation of [0.2, 0.2, 0.2] for (x, y, z). According to the setting in SECOND, in addition to a box which have physical collision with boxes in the current frame, several new boxes are added into the current training frame according to a marked box and a corresponding point in a corresponding frame, where eight for Cyclist, eight for Pedestrian and fifteen for Car.

TABLE 1

| Method | Speed (Hz) | Input L | Input I | Car BEV AP(%) Easy | Moder. | Hard | Pedestrian BEV AP(%) Easy | Moder. | Hard | Cyclist BEV AP(%) Easy | Moder. | Hard |
|---|---|---|---|---|---|---|---|---|---|---|---|---|
| F-PointNet | 5.9 | ✓ | ✓ | 91.17 | 84.67 | 74.77 | 57.13 | 49.57 | 45.48 | 77.26 | 61.37 | 53.78 |
| AVOD-FPN | 10 | ✓ | ✓ | 90.99 | 84.82 | 79.62 | 58.49 | 50.32 | 46.98 | 69.39 | 57.12 | 51.09 |

TABLE 1-continued

| Method | Speed (Hz) | L | I | Car BEV AP(%) Easy | Moder. | Hard | Pedestrian BEV AP(%) Easy | Moder. | Hard | Cyclist BEV AP(%) Easy | Moder. | Hard |
|---|---|---|---|---|---|---|---|---|---|---|---|---|
| MMF | 12.5 | ✓ | ✓ | 93.67 | 88.21 | 81.99 | N/A | N/A | N/A | N/A | N/A | N/A |
| IPOD | 5 | ✓ |  | 89.64 | 84.62 | 79.96 | 60.88 | 49.79 | 45.43 | 78.19 | 59.40 | 51.38 |
| F-ConvNet | 2.1 | ✓ |  | 91.51 | 85.84 | 76.11 | 57.04 | 48.96 | 44.33 | 84.16 | 68.88 | 60.05 |
| STD | 12.5 | ✓ |  | 94.74 | 89.19 | 86.42 | 60.02 | 48.72 | 44.55 | 81.36 | 67.23 | 59.35 |
| PointRCNN | 10 | ✓ |  | 92.13 | 87.39 | 82.72 | 54.77 | 46.13 | 42.84 | 82.56 | 67.24 | 60.28 |
| Fast Point R-CNN | 16.7 | ✓ |  | 90.87 | 87.84 | 80.52 | N/A | N/A | N/A | N/A | N/A | N/A |
| SECOND | 20 | ✓ |  | 89.39 | 83.77 | 78.59 | 55.99 | 45.02 | 10.93 | 76.50 | 56.05 | 49.45 |
| HRI-VoxelFPN | 50 | ✓ |  | 92.75 | 87.21 | 79.82 | N/A | N/A | N/A | N/A | N/A | N/A |
| PointPillars | 42.4 | ✓ |  | 90.07 | 86.56 | 82.81 | *57.60* | 48.64 | 45.78 | 79.90 | 62.73 | 55.58 |
| PIXOR++ | 35 | ✓ |  | *93.28* | 86.01 | 80.11 | N/A | N/A | N/A | N/A | N/A | N/A |
| HVNet | 31 | ✓ |  | 92.83 | *88.82* | *83.38* | 54.84 | *48.86* | *46.33* | *83.97* | 71.17 | 63.65 |

The experimental result is shown in Table 1. Table 1 shows performance of bird eye views on a KITTI test set. "L" denotes a lidar input, and "I" denotes an RGB image. Compared to the detectors on the KITTI leaderboard through evaluation methods for forty recall positions. The methods are divided into three types: a method based on a lidar and an image, a two-stage method based on a lidar only, and a one-stage method based on a lidar only. Bold results mean best in all methods, and Italic results mean best among the one-stage methods. As can be seen from the table that, the HVNet is better than all other methods in overall mAP and Cyclist. Even compared with the two-stage method, the HVNet can provide good performance for the detection of the car and pedestrian while ensuring a real-time operation. In the one-stage method, the HVNet has reached an advanced level in both the Car and Cyclist.

Figure 6:
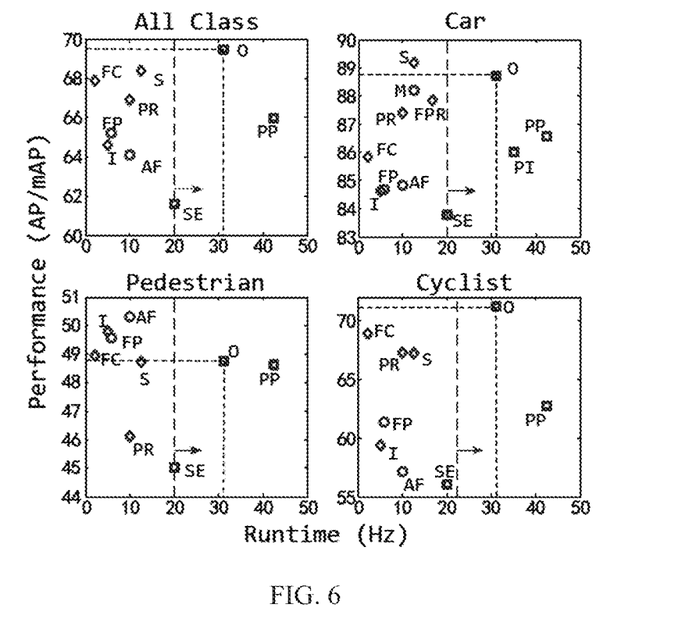
FIG. 6 is a schematic diagram illustrating a performance/speed comparison on a BEV of a KITTI data set according to an embodiment of the present disclosure.

The bird eye view (BEV) performance/speed comparison of each method in Table 1 on the KITTI dataset is shown in FIG. 6. The multi-sensor method is drawn as a circle, the two-stage lidar based method is drawn as a green diamond, and the one-stage method is drawn as a red square. The method on the right of the first vertical dotted line is real-time. The method should be at least 20 Hz because the in-vehicle application should cover 360 degree rather than 90 degrees limited by the KITTI dataset. The HVNet can reach a real-time speed (31 Hz) during inference.

Figure 7:
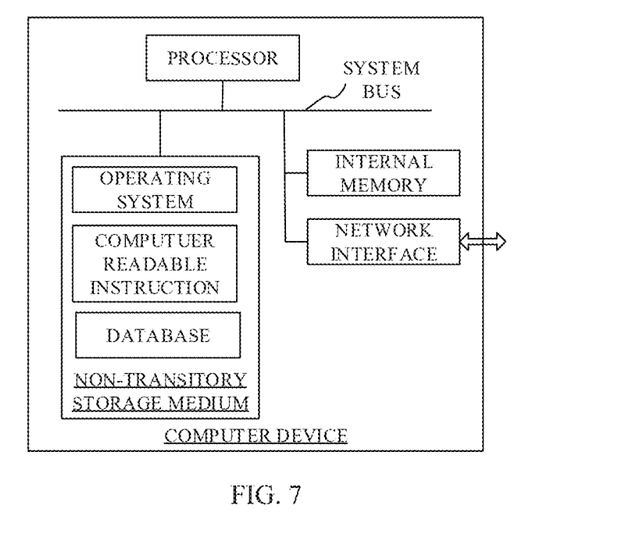
FIG. 7 is a structure block diagram of a computer device according to an embodiment of the present disclosure.

In an embodiment, a computer device is provided. The computer device may be an in-vehicle computer of an autonomous vehicle, or a computer of a robot or the like. An internal structure diagram of the computer device may be as shown in FIG. 7. The computer device includes a processor, a memory, a network interface and a database connected through a system bus. The processor of the computer device is configured to provide computing and control capabilities. The memory of the computer device includes a non-transitory storage medium and an internal memory. The non-transitory storage medium stores an operating system, a computer readable instruction and a database. The internal memory provides an environment for the operating system and the computer readable instruction in the non-transitory storage medium. The database of the computer device is configured to store the raw point cloud data and the pseudo-image feature map, or the like. The network interface of the computer device is configured to communicate with an external terminal through a network connection. The computer readable instruction is executed by the processor to implement a object detection method.

Those skilled in the art can understand that the structure shown in FIG. 7 is only a block diagram of a part of the structure related to the technical solution of the present disclosure, and does not constitute a limitation on the computer device to which the technical solution of the present disclosure is applied. The specific computer device may include more or less components than that shown in the figures, or some components are combined, or have different component arrangements.

A person of ordinary skill in the art may understand that all or part of the processes in the methods of the above embodiments may be completed by instructing a relevant hardware through the computer readable instruction, and the computer readable instruction may be stored in the non-transitory computer-readable storage medium. When the computer readable instruction is executed, the processes of the foregoing method embodiments are implemented. Any reference to the memory, storage, database or other media used in the embodiments provided in the present disclosure may include non-transitory and/or transitory memory. The non-transitory memory may include a read-only memory (ROM), a programmable ROM (PROM), an electrically programmable ROM (EPROM), an electrically erasable programmable ROM (EEPROM), or a flash memory. The transitory memory may include random access memory (RAM) or external cache memory. By way of illustration and not limitation, RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a memory bus (Rambus), a direct RAM (RDRAM), a direct memory bus dynamic RAM (DRDRAM), and a memory bus dynamic RAM (RDRAM), or the like.

The technical features of the embodiments described above can be arbitrarily combined. In order to simplify the description, all possible combinations of the technical features in the above embodiments are not described. However, as long as there is no contradiction in the combinations of these technical features, the combinations should be considered as the scope of the present disclosure.

The above-mentioned embodiments only express several exemplary embodiments of the present disclosure, and the description of which is more specific and detailed, but are not therefore to be construed as limiting the scope of the disclosure. It should be noted that, a person skilled in the art can also made several modifications and improvements without departing from the concept of the present disclosure, which all fall within the protection scope of the present disclosure. Therefore, the scope of protection of the present disclosure shall be subject to the appended claims.

What is claimed is:

1. An object detection network, comprising:
a processor and a memory storing program instructions executed by the processor, wherein the processor is configured to:
acquire a raw point cloud, perform a hybrid scale voxelization on a space of the raw point cloud by using multiple voxel scales, assign a corresponding voxel with the multiple voxel scales to each point in the raw point cloud, extract a hybrid scale voxel feature of the voxel from the raw point cloud, and project the hybrid scale voxel feature to generate a pseudo-image feature map;
perform a hybrid scale voxel feature fusion by using the pseudo-image feature map and generate multi-class pyramid features; and
predict a three-dimensional object box of a corresponding class according to the multi-class pyramid features.

2. The object detection network of claim 1, wherein the processor is further configured to execute the program instructions to perform attention feature encoding on a point in each voxel under a hybrid voxel scale and generate the hybrid scale voxel feature.

3. The object detection network of claim 1, wherein the process is further configured to execute the program instructions to restore projection scale information; and the projection scale information is configured to be projected into the pseudo-image feature map.

4. The object detection network of claim 1, wherein the processor is further configured to execute the program instructions to aggregate pseudo-image feature maps of multiple projection scales.

5. The object detection network of claim 1, wherein the pseudo-image feature map has a corresponding projection scale, and a next projection scale is a preset multiple of a previous projection scale.

6. The object detection network of claim 1, wherein the processor is further configured to execute the program instructions to perform a class feature extraction on an aggregated feature of a main stream network to obtain a class-specific pyramid feature.

7. The object detection network of claim 6, wherein the aggregated feature of the main stream network comprises an aggregated feature of a network block; and a process of performing the class feature extraction on the aggregated feature of the main stream network comprises:
connecting the aggregated feature of the network block at a smallest projection scale, obtaining an intermediate feature, performing a layer-wise fusion on the intermediate feature by using convolutional layers with different strides and the intermediate feature, and obtaining the class-specific pyramid feature.

8. The object detection network of claim 7, wherein a plurality of down-sample convolutional layers are adopted in a fusion process.

9. The object detection network of claim 1, wherein the processor is configured to execute the program instructions to use a vertex position offset between a real box and an anchor as an object function of a three-dimensional object box.

10. An object detection method, comprising:
acquiring a raw point cloud, performing a hybrid scale voxelization on a space of the raw point cloud by using multiple voxel scales, assigning a corresponding voxel with the multiple voxel scales to each point in the raw point cloud, extracting a hybrid scale voxel feature of the voxel from the raw point cloud, and projecting the hybrid scale voxel feature to generate a pseudo-image feature map;
performing a hybrid scale voxel feature fusion by using the pseudo-image feature map and generating multi-class pyramid features; and
predicting a three-dimensional object box of a corresponding class according to the multi-class pyramid features.

11. The object detection method of claim 10, wherein the extracting the hybrid scale voxel feature from the raw point cloud comprises:
acquiring the raw point cloud, and performing a hybrid scale voxelization on the raw point cloud; and
performing feature encoding by using the point cloud after the hybrid scale voxelization, generating a point-wise hybrid scale voxel feature.

12. The object detection method of claim 10, wherein the projecting the hybrid scale voxel feature to generate the pseudo-image feature map comprises:
restoring projection scale information by using the hybrid scale voxel feature, and generating the pseudo-image feature map according to the projection scale information.

13. The object detection method of claim 10, wherein the performing hybrid scale feature fusion by using the pseudo-image feature map comprises:
aggregating pseudo-image feature maps of multiple projection scales to obtain an aggregated feature of a main stream network; and
performing a class feature extraction on the aggregated feature of the main stream network to obtain a class-specific pyramid feature.

14. The object detection method of claim 13, wherein the aggregating the pseudo-image feature maps of the multiple projection scales comprises:
inputting the pseudo-image feature maps of the multiple projection scales respectively into each network block of the main stream network;
aggregating, by a latter network block, an aggregated feature of a previous network block and a pseudo-image feature map of a next projection scale, and outputting an aggregated feature of the latter network block until an aggregated feature of each network is obtained.

15. A non-transitory computer readable storage medium storing computer readable instructions, wherein the computer readable instructions are executed by a processor to execute a method comprising:
acquiring a raw point cloud, performing a hybrid scale voxelization on a space of the raw point cloud by using multiple voxel scales, assigning a corresponding voxel with the multiple voxel scales to each point in the raw point cloud, extracting a hybrid scale voxel feature of the voxel from the raw point cloud, and projecting the hybrid scale voxel feature to generate a pseudo-image feature map;
performing a hybrid scale voxel feature fusion by using the pseudo-image feature map and generating multi-class pyramid features; and
predicting a three-dimensional object box of a corresponding class according to the multi-class pyramid features.

16. The non-transitory computer readable storage medium of claim 15, wherein the computer readable instructions are executed by the processor so that the method further comprises:
acquiring the raw point cloud, and performing a hybrid scale voxelization on the raw point cloud; and
performing feature encoding by using the point cloud after the hybrid scale voxelization, and generating a point-wise hybrid scale voxel feature.

17. The non-transitory computer readable storage medium of claim 15, wherein the computer readable instructions are executed by the processor so that the method further comprises:

aggregating pseudo-image feature maps of multiple projection scales to obtain an aggregated feature of a main stream network; and performing a class feature extraction on the aggregated feature of the main stream network and obtaining a class-specific pyramid feature.

\* \* \* \* \*